W. A. RICE.
DISINFECTING DEVICE FOR MAUSOLEUMS.
APPLICATION FILED APR. 7, 1913.
1,123,379.  Patented Jan. 5, 1915.
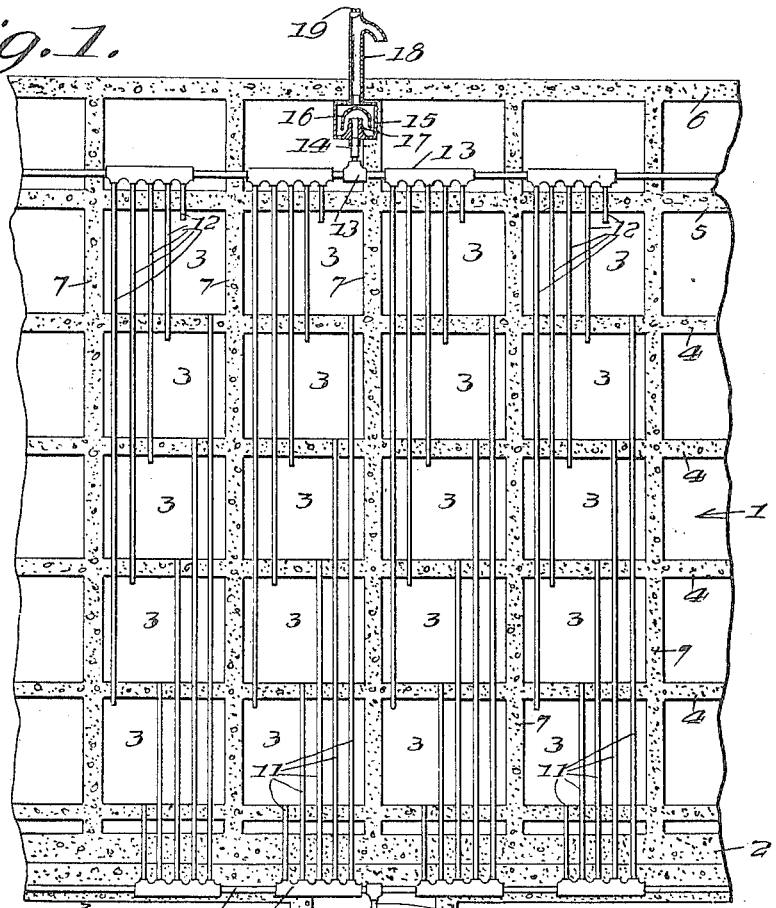
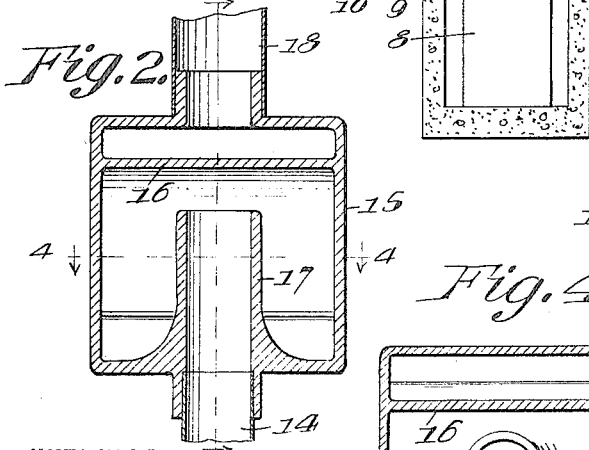
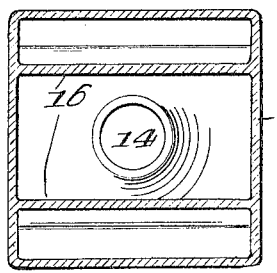
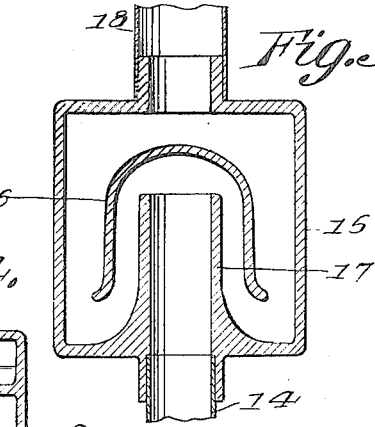

UNITED STATES PATENT OFFICE.

WILBUR A. RICE, OF ALTOONA, PENNSYLVANIA.

DISINFECTING DEVICE FOR MAUSOLEUMS.

1,123,379.  Specification of Letters Patent.  Patented Jan. 5, 1915.

Application filed April 7, 1913. Serial No. 759,384.

*To all whom it may concern:*

Be it known that I, WILBUR A. RICE, a citizen of the United States, residing at Altoona, in the county of Blair and State of Pennsylvania, have invented new and useful Improvements in Disinfecting Devices for Mausoleums, of which the following is a specification.

My invention consists of a system of piping connected to each crypt in the mausoleum, and having a single outlet at the top and also one at the bottom. The outlet at the top is provided with a special form of trap which is designed for receiving a disinfectant and holding it in such a manner that all the air is compelled to pass over the disinfectant before escaping into the outside air.

With this and other objects in view my invention consists in the combination and arrangement of parts as shown in the accompanying drawings, in which—

Figure 1 is a view showing my system complete. Fig. 2 is a cross section of the trap at the top. Fig. 3 is a cross section on line 3—3, Fig. 2. Fig. 4 is a horizontal section through the trap on line 4—4, Fig. 2.

My invention, more particularly described, is as follows:—To each of the crypts "3" is connected a pipe "12" opening from the upper wall into the crypt. All of these pipes "12" are connected to a manifold "13", which is a part of a horizontal line opening into a riser "14". On this riser "14" is a trap "15". The inside of this trap is so formed that a portion "17" continues the riser to near the top of the trap. Over this portion "17" is a hood "16" which extends from side to side of the trap and is preferably formed as an integral part of the same.

At the upper portion of the trap is a pipe "18" which leads out through the top of the mausoleum.

The upper end of the pipe "18" is formed with a downwardly curved portion so as to direct the air downward and not leave any chance for the elements to get in. It has an opening at the top which is closed by means of a thumb nut "19", which is intended to use in filling the trap with disinfectant.

By reference to Figs. 2, 3 and 4 it can readily be seen that any air coming up through one of the tubes "12" entering the manifold "13" must go through the riser "14", be deflected by the hood "16" and pass through the disinfectant, which is above the hood and on each side of it, before it can enter the open air.

The trap is preferably made of cast iron, but can be made of any other metal, and it is also preferably covered with a porcelain lining in order to prevent oxidation of the metal.

The disinfectant may be in the form of tablets or crystals and can be replaced whenever it has wasted away.

The system further consists of a tube "11" from the bottom of each crypt leading downward into a manifold "9", which is connected by a lateral tube "10", with the tube "8'" directly to a tank "8" in a trench below the crypts. This takes care of all the drippings that may form in the crypt and in this manner the surrounding air is kept perfectly pure and sanitary.

A plug similar to plug "19" is placed in the two vent openings of each crypt, and when a body is placed therein these plugs are removed thus connecting it up with the system. This is continued in each case until the entire mausoleum is connected in the same manner.

I do not wish to limit myself to the specific form of draining and ventilating shown, but any system that will accomplish the same object may be employed.

What I claim is—

A trap for disinfecting air or gas consisting of a disinfecting chamber, a pipe leading upward near the center of said chamber, and a hood extending over said pipe and integral with said pipe and chamber so as to deflect the air or gas passing up through said pipe, said chamber having a space outside of said hood for receiving disinfectant and an integral outlet for air or gas at the top, said hood having a top with symmetrical downwardly extending sides adapted to deflect disinfectant introduced through said outlet into said space.

WILBUR A. RICE.

Witnesses:
C. R. SLADE,
CARL A. FAY.

Copies of this patent may be obtained for five cents each, by addressing the "Commissioner of Patents, Washington, D. C."